United States Patent [19]
Harris

[11] 3,985,951
[45] Oct. 12, 1976

[54] ELECTRICAL INSULATOR INCLUDING A POLYMERIC RESIN FOAM FORMING COMPOSITION AND METHOD OF INSULATION

[75] Inventor: Robert L. Harris, Freeport, N.Y.
[73] Assignee: Niemand Bros. Inc., Elmhurst, N.Y.
[22] Filed: July 10, 1975
[21] Appl. No.: 594,796

[52] U.S. Cl. .................... 174/138 F; 138/141; 138/146; 156/79; 156/86; 174/84 R; 174/110 F; 174/DIG. 8; 264/46.9; 264/230; 428/315; 428/320
[51] Int. Cl.² .................... H01B 17/58; H01B 3/18; H01R 5/12
[58] Field of Search ............... 174/19, 21 R, 74 A, 174/76, 84 R, 87, 110 F, 138 F, DIG. 8; 29/628; 138/140, 141, 145, 146; 156/49, 51, 52, 78, 79, 84–86; 206/328, 524; 264/45.1, 46.4, 46.5, 46.8, 46.9, 230, 272, 46.6; 428/310, 313, 315, 320, 36

[56] References Cited
UNITED STATES PATENTS

| | | | |
|---|---|---|---|
| 2,186,793 | 1/1940 | Wodtke | 174/110 F UX |
| 3,243,211 | 3/1966 | Wetmore | 174/DIG. 8 |
| 3,420,363 | 1/1969 | Blickensderfer | 264/46.5 X |
| 3,836,702 | 9/1974 | Plummer | 174/76 X |

FOREIGN PATENTS OR APPLICATIONS

| | | | |
|---|---|---|---|
| 1,920,637 | 10/1970 | Germany | 174/76 |
| 6,803,179 | 9/1968 | Netherlands | 174/84 R |

*Primary Examiner*—Laramie E. Askin
*Attorney, Agent, or Firm*—Kane, Dalsimer, Kane, Sullivan and Kurucz

[57] ABSTRACT

Disclosure is made of a novel sheath and the method of its use for protecting electrical conductors and connections. The sheath comprises a tubular body which defines an interior space. The space contains an expandable, synthetic, polymeric resin foam forming composition. The method of the invention comprises inserting an electrical conductor or connection into the sheath of the invention and activating the foam forming composition to foam and encapsulate the conductor or connection. The installed sheaths protect the conductors and/or connections from degradation by environmental conditions, are resilient and improve the insulative quality of the electrical connection.

11 Claims, 3 Drawing Figures

ELECTRICAL INSULATOR INCLUDING A POLYMERIC RESIN FOAM FORMING COMPOSITION AND METHOD OF INSULATION

BACKGROUND OF THE INVENTION

1. Field of the Invention

The invention relates to insulative electrical connectors for conductors and more particularly concerns heat sealable, synthetic polymer resin sleeves or tubes which may be slipped over an electrical connection and fused to the connection.

2. Brief Description of the Prior Art

Prior hereto, sleeves of heat shrinkable materials have been employed to enclose electrical conductors and connections; see for example U.S. Pat. No. 2,027,962. Heat shrinkable sleeves have also been employed for this purpose, which include fusable liners to assist in sealing the sleeve to the conductors or their insulative coverings; see for example U.S. Pat. Nos. 3,243,211; 3,582,457; and 3,814,139.

The present invention is an improvement over the prior art heat shrinkable tubes and processes. First, the sheaths of the present invention may be, and in fact preferably are fabricated from heat-shrinkable polymeric resin material but this is not a necessity as is the case in the prior art. Indeed, the sheath may be constructed according to the invention with non-shrinkable materials, lending greater versatility to their applications where materials of greater rigidity and/or dimensional stability are desired. Consequently, the process of the invention is also advantageous since it is not dependent upon exposing a heat-shrinkable tube to a specific heat-shrinking temperature. Secondly, the prior art sleeves had to be provided in a variety of different diameters because a different sleeve was needed for each of the various conductors and connections of differing gauge. This was necessitated by the more critical need to approximate the diameter or size of the conductor to be covered. A large inventory of sleeves of differing dimension was required to accomplish this. Because the sheaths of the present invention are adaptable to installation on a wider variety of gauges, fewer sizes are required and smaller inventories are required to be maintained. This is a significant economical advantage.

Further, the sheaths and process of the invention insulate the electrical conductors and connections by encapsulating them in a matrix of a polymeric resin foam. This advantageously improves the physical strength of the electrical connection as well as improving the quality of protection afforded to the electrical conductor or connection for which protection is sought. More specifically, an electrical conductor or connection encapsulated in a polymeric resin foam according to the invention has improved dielectric properties in that substitution of a gas for part of the conventional solid polymer insulation results in lowered dielectric constant, dissipation factor and increased dielectric strength. This is particularly advantageous for low frequency electrical systems where it is desirable to make the dielectric constant of insulative material as low as possible. In high-frequency systems the lowered dissipation factor is highly advantageous.

Encapsulation of the electrical conductor or connection in a closed cell polymer resin foam protects the conductor and/or connection from the weather, humidity, galvanic action (particularly where the connection is between diverse metals) adverse thermal conditions (the foam is heat-insulative) rot, mildew, flex fatigue and the like. The foam also serves to cushion the connection, providing more flexible connections and shock absorbing connections. Fire resistant foam formulations may be used to give the electrical connections greater protection against open flame.

SUMMARY OF THE INVENTION

The invention comprises a sheath for protecting electrical conductors and connections, which comprises; a tubular body adapted to enclose electrical conductors and connections within a space defined by said body and an expandable, synthetic, polymeric resin foam forming composition disposed in said space.

The invention also comprises a method of protecting electrical conductors and connections from exposure to degradative environments, which comprises; providing a sheath which comprises a tubular body adapted to enclose said electrical conductors and connections within a space defined by said body and an expandable, synthetic, polymeric resin foam forming composition disposed in said space; inserting said electrical conductors and connections into said space; and initiating foaming of said foam forming composition.

DETAILED DESCRIPTION OF THE PREFERRED EMBODIMENTS

Figure 2:
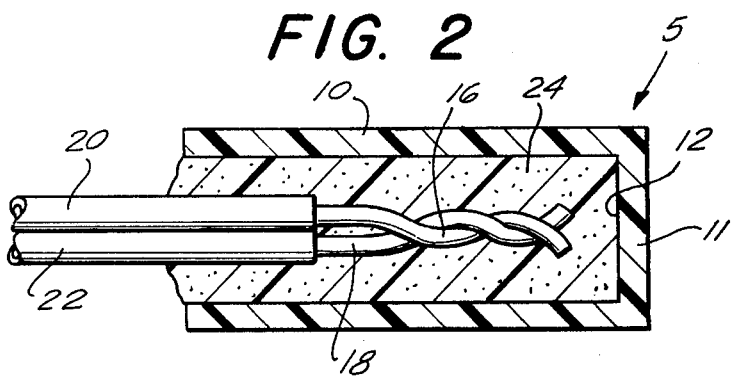
FIG. 2 is a cross-sectional, side elevation as in FIG. 1 but after installation.
Figure 3:
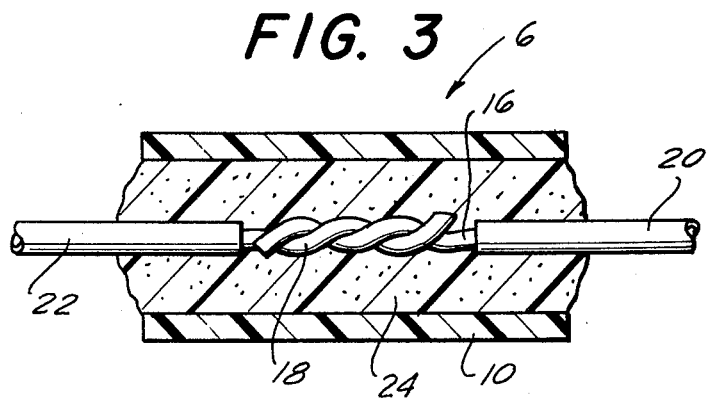
FIG. 3 is a cross-sectional, side elevation of another sleeve embodiment of the invention after installation on an electrical connection.

For continuity, the preferred embodiments of the invention are best described with reference to the accompanying drawings of FIGS. 1–3.

Figure 1:
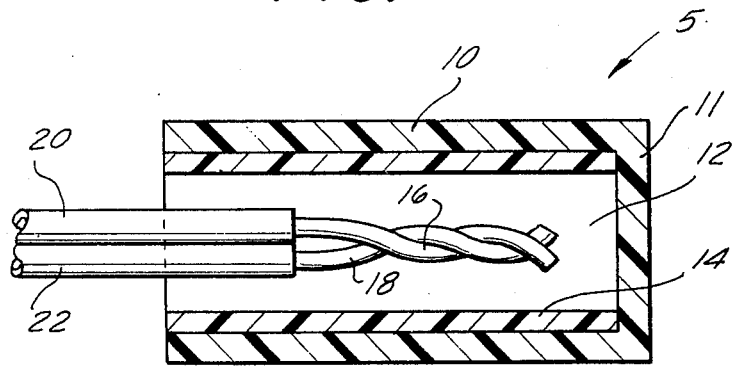
FIG. 1 is a cross-sectional, side elevation of a preferred embodiment sleeve of the invention prior to installation on an electrical connection.

FIG. 1 is a cross-sectional side elevation of a sheath embodiment 5 which comprises a tubular body 10 closed at one end by integral end wall 11. The body 10 and integral end wall 11 may be fabricated from any convenient rigid, semi-rigid or flexible material. Representative of such materials are metals such as iron, steel, aluminum, tin and the like; cellulose forms such as paper, wood and the like; and polymeric materials both natural and synthetic such as cellulose acetate rubber, polyethylene, polypropylene, acrylonitrile-butadiene-styrene copolymers, polyurethane elastomer, polystyrene, polyvinyl chloride, butadiene-acrylonitrile rubber, polyimide, polyamide, polyacrylic and the like. Advantageously the material of body 10 and end wall 11 is electrically non-conductive and thermally conductive. Preferably body 10 and end wall 11 are weather-proof or treated to make them weather-proof, i.e.; resistant to the effects of water, heat, cold and sunlight. Preferably, the body 10 and end wall 11 are fabricated from a flexible, oriented thermoplastic having a heat activatable memory which upon exposure to a temperature above room temperature will shrink in dimension a predetermined amount. Representative of such preferred thermoplastics are fluorinated ethylene and propylene polymers, polyethylene terephthalate, irradiated and heat deformed polyolefins and the like. Most preferred is the polyethylene terephthalate. The tubular bodies 10 may be fabricated by conventional extrusion and laminating techniques; see for example U.S. Pat. No. 3,491,799.

The body 10 and end wall 11 define space 12 which is adapted to receive, upon insertion, an electrical connection as shown by twisted conductors 16, 18. Space 12 also has disposed therein an expandable, synthetic, polymeric resin foam forming composition 14. Although the composition 14 may be disposed in space 12 in any convenient manner, it is preferably formulated and disposed so as to adhere to the inner surface of the containing body 10 and/or wall 11. Foam forming composition 14 may be any expandable composition which upon expansion forms a cellular plastic foam having dielectric properties. Any of the well known, synthetic polymeric resin foams which are initiated by actinic radiation are useful in the sheaths of the invention. Preferably the foams formed are closed cell foams.

Preferred compositions 14 are dispersions of polymer resins such as polyvinyl chloride, polyethylene, polypropylene, natural rubber, butadiene-acrylonitrile rubber, styrene-butadiene copolymers, polyamides, polyesters and the like in admixture with conventional blowing agents characterized by their decomposition at known temperatures to generate gaseous products. Preferred blowing agents are those which decompose under actinic radiation to produce nitrogen gas. Nitrogen gas is the preferred blowing gas because of its non-oxidative properties. Representative of such blowing agents are azodicarbonamide, 4,4'-oxybis (benzenesulphon hydrazide), dinitrosopentamethylene tetramine, tris [m-azidosulfonylbenzene] isocyanurate, tris [p-azidosulfonylbenzene] isocyanurate, p-toluenesulfonyl hydrazide, 2,2'-azobisisobutyronitrile and the like.

The proportion of blowing agent may be varied according to known techniques to cause a foam expansion of up to about 10 times. The techniques of preparing such blowing agents in polymer resin dispersions is well known; see for example Goldberg and Bolabanov, Zh. Organ. Kim., 1,(9), 1604–6, (1965) (Russ.). In general the blowing agent is blended into the polymer material. Blending may be carried out by milling on a conventional rubber mill or by dissolving in a solution of the polymer. Other methods of mixing the blowing agents and polymer resins will be apparent to those skilled in the art. Additives such as fillers, extenders, stabilizers, surfactants, dyes, plasticizers, fire retardants and the like may also be used to compound the compositions 14 with desired specific properties. Representative of polymeric resin foam forming compositions which may be used to coat the inside surface of a polyethylene terephthalate tubular body are the following. All parts are by weight.

Preparation 1

Expandable polyamide composition

An appropriate vessel is charged with from 50 to 50.4 parts of a thermoplastic polyamide resin (Versalon 750; General Mills, Inc., Minneapolis, Minn.), 30.0 parts of isopropanol and 15.0 parts of toluene. The mixture is blended and 4.5 parts of micropulverized asbestos and from 0.1 to 0.5 parts of p-toluenesulfonyl hydrazide is added with stirring. The resulting mixture is a polyamide foam forming composition which is activatable to obtain a closed cell polyamide foam by heating circa 200° F. to 250° F. Depending on the proportion of p-toluenesulfonyl hydrazide, the density of the foam obtained may be between about 2 to 5 pounds per cubic foot, expansion being from 2 to 10 times the original volume of the foam forming composition.

Preparation 2

An appropriate vessel is charged with from 56.8 to 57.2 parts of a thermoplastic polyester dissolved in 38.0 parts of methyl ethyl ketone [Bostik 7240; U.S.M. Corporation, Middletown, Mass.; 14,000 cps consistency (Brookfield at 25° C.)]. With stirring, 4.7 parts of silica (Cab-O-Sil) and from 0.1 to 0.5 parts of 2,2'-azobisisobutyronitrile is added to obtain a polyester foam forming composition.

The compositions 14 are preferably activated to foam by exposure to actinic radiation. If the body 10 is permeable to ultraviolet radiation, composition 14 may include a blowing agent decomposable by exposure under a source of ultraviolet. Preferably, the blowing agent decomposes to form foam under infra-red radiation, i.e.; heat.

The method of the invention comprises inserting electrical conductors and/or connections into the sheath 5 of the invention as illustrated in FIG. 1 showing conducting wires 16 and 18 inserted with parts of their insulated portions 20 and 22 into space 12. A connection is made between conductors 16 and 18. In the next step of the method of the invention, the foam forming composition 14 is activated to form a polymeric resin foam. Illustratively, if the foam forming composition 14 is one of preparations 1 and 2, supra., coated at a thickness of about 15/1000th of an inch on the inner surface of a tube of polyethylene terephthalate, activation occurs by applying a heat of circa 200° F to 250° F. to the sheath 5. The composition 14 melts or fuses, the blowing agent decomposes to generate nitrogen gas and the composition 14 expands to form a cellular polymeric resin foam 24 as shown in FIG. 2. FIG. 2 is a cross-sectional, side elevation as seen in FIG. 1 but after activation of the foam forming composition 14 to encapsulate conductors 16, 18 in polymer resin foam 24. Upon cooling, the foam solidifies, entrapping the nitrogen gas bubbles. Since the body 10 was a heat-shrinkable material in our illustration, the sheath 5 is also shown of reduced dimension in FIG. 2. This advantageously forms a tight bond between wall 10 and foam 24. The foam 24 encapsulation is weather-proofed by the bonded wall 10. The wall 10 also provides a physical protection for low density foams, which are particularly preferred for their lower dielectric constant, dissipation factor and increased dielectric strength. By low density foam, I mean a polymeric resin foam having an average density of about 2–4 pounds per cubic foot. Those skilled in the art are well aware of the techniques for forming foams of such density.

Those skilled in the art will also appreciate that many variations of the preferred embodiments described above may be made without departing from the spirit and scope of the invention. For example, the tubular sheath of the invention may have two open ends as shown installed in FIG. 3. FIG. 3 is a cross-sectional, side elevation of an alternate embodiment sheath 6 having both ends open and foamed in place on electrical connection 16, 18.

What is claimed is:

1. A sheath for protecting electrical conductors and connections, which comprises; a tubular body having first and second ends, said body with said ends defining an empty space to receive and enclose electrical conductors and connections, and an unfoamed, expandable, synthetic, polymeric resin foam forming composition coating the inside walls of said tubular body.

2. A sheath according to claim 1 wherein said tubular body is closed at one end.

3. A sheath according to claim 1 wherein said tubular body is fabricated from a flexible, oriented thermoplastic material having a heat activatable memory.

4. A sheath according to claim 3 wherein said thermoplastic material is polyethylene terephthalate.

5. A sheath according to claim 1 wherein said tubular body is electrically non-conductive and thermally conductive.

6. A sheath according to claim 1 wherein said composition is a closed cell foam forming composition.

7. A sheath according to claim 1 wherein said foam foaming composition comprises a polymer resin dispersion in admixture with a blowing agent which decomposes under actinic radiation to produce nitrogen gas.

8. A sheath according to claim 7 wherein said composition comprises a polyamide resin and p-toluenesulfonyl hydrazide.

9. A sheath according to claim 7 wherein said composition comprises a polyester resin and 2,2'-azobisisobutyronitrile.

10. A sheath according to claim 7 wherein said foam forming composition will form a foam having a density of from about 2 to about 4 pounds per cubic foot.

11. A sheath according to claim 7 wherein said actinic radiation is infra-red radiation.

* * * * *